(12) United States Patent
Nakata et al.

(10) Patent No.: US 8,155,859 B2
(45) Date of Patent: Apr. 10, 2012

(54) FUEL INJECTION DEVICE AND METHOD FOR EXAMINING THE SAME

(75) Inventors: Kenichiro Nakata, Kariya (JP); Koji Ishizuka, Chita-gun (JP)

(73) Assignee: Denso Corporation, Kariya (JP)

( * ) Notice: Subject to any disclaimer, the term of this patent is extended or adjusted under 35 U.S.C. 154(b) by 903 days.

(21) Appl. No.: 12/194,917

(22) Filed: Aug. 20, 2008

(65) Prior Publication Data

US 2009/0063011 A1 Mar. 5, 2009

(30) Foreign Application Priority Data

Aug. 31, 2007 (JP) ................................. 2007-227119

(51) Int. Cl.
*F02D 41/30* (2006.01)
(52) U.S. Cl. ..................................... 701/103; 73/114.51
(58) Field of Classification Search .................. 123/490, 123/494, 673, 674; 73/114.51, 114.46; 701/102, 701/103, 104
See application file for complete search history.

(56) References Cited

U.S. PATENT DOCUMENTS

| | | | |
|---|---|---|---|
| 5,634,448 A | 6/1997 | Shinogle et al. | |
| 6,349,702 B1 * | 2/2002 | Nishiyama | 123/456 |
| 6,729,297 B2 | 5/2004 | Futonagane et al. | |
| 6,976,389 B2 * | 12/2005 | Farth et al. | 73/114.51 |
| 7,835,850 B2 * | 11/2010 | Nakata et al. | 701/104 |

FOREIGN PATENT DOCUMENTS

| | | |
|---|---|---|
| JP | 06-264803 | 9/1994 |
| JP | 6-264803 | 9/1994 |
| JP | 07-027640 | 1/1995 |
| JP | 11-050903 | 2/1999 |
| JP | 2001-280217 | 10/2001 |
| JP | 2002-039903 | 2/2002 |
| JP | 2002-39903 | 2/2002 |
| JP | 2002-236069 | 8/2002 |
| JP | 2002-322965 | 11/2002 |
| JP | 2003-279433 | 10/2003 |
| JP | 2004-27910 | 1/2004 |
| JP | 2005-345215 | 12/2005 |
| JP | 2006-200378 | 8/2006 |

OTHER PUBLICATIONS

U.S. Appl. No. 12/194,130, Kenichiro Nakata et al., filed Aug. 19, 2008.
U.S. Appl. No. 12/197,447, Kenichiro Nakata et al., filed Aug. 25, 2008.
U.S. Appl. No. 12/210,409, Koji Ishizuka et al., filed Sep. 15, 2008.

(Continued)

*Primary Examiner* — Stephen K Cronin
*Assistant Examiner* — Arnold Castro
(74) *Attorney, Agent, or Firm* — Nixon & Vanderhye P.C.

(57) ABSTRACT

A fuel injection device includes a fuel injection valve for injecting fuel. A pressure sensor is configured to output detection signal correspondingly to pressure of the fuel. The fuel injection device further includes a storage unit for storing individual difference information, which indicates an output characteristic of the detection signal. The output characteristic is obtained by an examination. The individual difference information indicates a relationship between change in test pressure and change in detection signal. The test pressure is actually applied to the pressure sensor in the examination. The change in detection signal is attributed to the change in test pressure.

14 Claims, 4 Drawing Sheets

OTHER PUBLICATIONS

U.S. Appl. No. 12/195,609, Kenichiro Nakata et al., filed Aug. 21, 2008.
U.S. Appl. No. 12/210,440, Kenichiro Nakata et al., filed Sep. 15, 2008.
U.S. Appl. No. 12/233,800, Kenichiro Nakata et al., filed Sep. 19, 2008.
U.S. Appl. No. 12/235,917, Kenichiro Nakata et al., filed Sep. 23, 2008.
U.S. Appl. No. 12/236,882, Koji Ishizuka et al., filed Sep. 24, 2008.
U.S. Appl. No. 12/201,426, Kenichiro Nakata et al., filed Aug. 29, 2008.
U.S. Appl. No. 12/255,936, Koji Ishizuka et al., filed Oct. 22, 2008.
U.S. Appl. No. 12/256,100, Koji Ishizuka et al., filed Oct. 22, 2008.
U.S. Appl. No. 12/258,726, Koji Ishizuka et al., filed Oct. 27, 2008.
U.S. Appl. No. 12/258,750, Koji Ishizuka et al., filed Oct. 27, 2008.
Japanese Office Action dated Nov. 24, 2009, issued in corresponding Japanese Application No. 2007-227119, with English translation.
Nishino "Microcomputer + Sensor Practical Use Guide", Kougakutosho Co., Jun. 1, 1982, $5^{th}$ edition, pp. 83-94, with partial English translation.
Office Action (3 pgs.) dated Nov. 24, 2009 issued in corresponding Japanese Application No, 2007-227119 with an at least partial English-language translation thereof (3 pgs.).
Nishino, "Microcomputer + Sensor Practical Use Guide", Kougaskutosho Co., Jun. 1, 1982, $5^{th}$ edition, pp. 83-94, with partial English translation.
U.S. Appl. No. 11/930,668 of Ishizuka, filed Oct. 31, 2007.
U.S. Appl. No. 12/179,235 of Ishizuka, filed Jul. 24, 2008.
U.S. Appl. No. 12/186,038 of Nakata, filed Aug. 5, 2008.
U.S. Appl. No. 12/187,638 of Nakata, filed Aug. 7, 2008.
U.S. Appl. No. 12/189,376 of Nakata, filed Aug. 11, 2008.
Japanese Office Action dated Jun. 30, 2009, issued in corresponding Japanese Application No. 2007-227119, with English translation.

* cited by examiner

FUEL INJECTION DEVICE AND METHOD FOR EXAMINING THE SAME

CROSS REFERENCE TO RELATED APPLICATIONS

This application is based on and incorporates herein by reference Japanese Patent Application No. 2007-227119 filed on Aug. 31, 2007.

FIELD OF THE INVENTION

The present invention relates to a fuel injection device having a fuel injection valve for injecting fuel, which is distributed from a pressure-accumulation injection device.

BACKGROUND OF THE INVENTION

Conventionally, a fuel injection valve is provided to an internal combustion engine for injecting fuel so as to perform combustion in an engine. For example, according to JP-A-2006-200378, a pressure sensor is provided to a fueling path for detecting pressure of fuel in the fueling path so as to control the fuel injection valve based on the detected pressure.

The pressure sensor is configured to output a detection signal according to the pressure of fuel. The output characteristic of the detection signal has an individual difference. For example, when two different pressure sensors detect the same pressure, the detection signals of the pressure sensors have a deviation therebetween. The deviation in detection signals of the pressure sensors may be obtained beforehand by conducting an examination. However, an error may be caused in obtained deviation in detection signals.

SUMMARY OF THE INVENTION

In view of the foregoing and other problems, it is an object of the present invention to produce a fuel injection device having a pressure sensor, in which an error caused in an examination is reduced. It is another object of the present invention to produce a method for examining the fuel injection device.

The inventors carried out a study to find a structure in which individual difference of the pressure sensor is reflected on a fuel injection control. Specifically, in the present structure, an output characteristic of the detection signal of the pressure sensor is beforehand examined. Subsequently, the output characteristic obtained by the examination is stored as individual difference information in a storage unit. Thus, the fuel injection valve is controlled based on the individual difference information stored in the storage unit.

The present inventors carried out the examination as follows. First, test pressure is generated using a test apparatus such as a pressure generator. The test pressure is actually applied to the pressure sensor, and a detection signal outputted from the pressure sensor is measured. Next, a storage unit stores individual difference information as a relationship between the text pressure and the measured detection signal as an output absolute value. However, the generated test pressure does not necessarily coincide with target pressure, which is supposed to be generated, and an offset error may be caused in test pressure. Thus, the offset error may be reflected on the detection signal related to the individual difference information. Various kinds of examination condition errors may be further reflected on the detection signal as individual difference information, in addition to the error in test pressure.

According to one aspect of the present invention, a fuel injection device comprises a fuel injection valve for injecting fuel. The fuel injection device further comprises a pressure sensor configured to output a detection signal correspondingly to pressure of the fuel. The fuel injection device further comprises a storage unit for storing individual difference information, which indicates an output characteristic of the detection signal, the output characteristic being obtained by an examination. The individual difference information indicates a relationship between change in test pressure and change in detection signal. The test pressure is actually applied to the pressure sensor in the examination. The change in detection signal is attributed to the change in test pressure.

According to another aspect of the present invention, a fuel injection device comprises a fuel injection valve for injecting fuel. The fuel injection device further comprises a pressure sensor configured to output a detection signal correspondingly to pressure of the fuel. The fuel injection device further comprises a storage unit for storing individual difference information, which indicates an output characteristic of the detection signal, the output characteristic being obtained by an examination. The pressure sensor includes a sensor element and a waveform processing unit. The sensor element is configured to convert the pressure of fuel into an electric signal. The waveform processing unit is configured to input the electric signal, perform a waveform processing of the electric signal, and output the detection signal. The individual difference information indicates one of: a relationship between change in test electric signal, which the waveform processing unit inputs in the examination, and change in detection signal, which is attributed to the change in test electric signal, and a relationship between change in pressure, which corresponds to the change in test electric signal, and the change in detection signal, which is attributed to the change in test electric signal.

According to another aspect of the present invention, a method for examining a fuel injection system, which includes a fuel injection valve, a pressure sensor for outputting a detection signal, a storage unit for storing individual difference information, and a control unit for controlling the fuel injection valve based on the stored individual difference information and the detection signal, the method comprises applying test pressure including first and second test pressure to the pressure sensor so as to obtain first and second detection signals, which respectively correspond to the first and second test pressure. The method further comprises calculating a difference between the first and second test pressure as a test pressure change. The method further comprises calculating a difference between the first and second detection signals as a detection signal change. The method further comprises storing individual difference information, which indicates a relationship between the test pressure change and the detection signal change, as an output characteristic of the detection signal in the storage unit.

According to another aspect of the present invention, a method for examining a fuel injection system, which includes a fuel injection valve for injecting fuel, a sensor element for converting pressure of the fuel into an electric signal, a waveform processing unit for performing a waveform processing of the electric signal to a detection signal, a storage unit for storing individual difference information, and a control unit for controlling the fuel injection valve based on the stored individual difference information and the detection signal, the method comprises applying test electric signal including first and second test electric signals to the waveform processing unit so as to obtain first and second detection signals, which respectively correspond to the first and second electric signals. The method further comprises calculating a difference between the first and second electric signals as a test electric signal change. The method further comprises calculating a difference between the first and second detection signals as a detection signal change. The method further comprises storing individual difference information, which indicates a relationship between the test electric signal change and the detection signal change, as an output characteristic of the detection signal in the storage unit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS (Embodiment)

An embodiment embodying a fuel injection device and a fuel injection system will be described below with reference to drawings. A fuel injection device according to the present embodiment is mounted to, for example, a common-rail fuel injection system for an internal combustion engine for an automobile. For example, the present fuel injection device is used for directly injecting high-pressure fuel to a combustion chamber in a cylinder of a diesel engine. The high-pressure fuel is, for example, light oil, which is at injection pressure more than 100 MPa.

Figure 1:
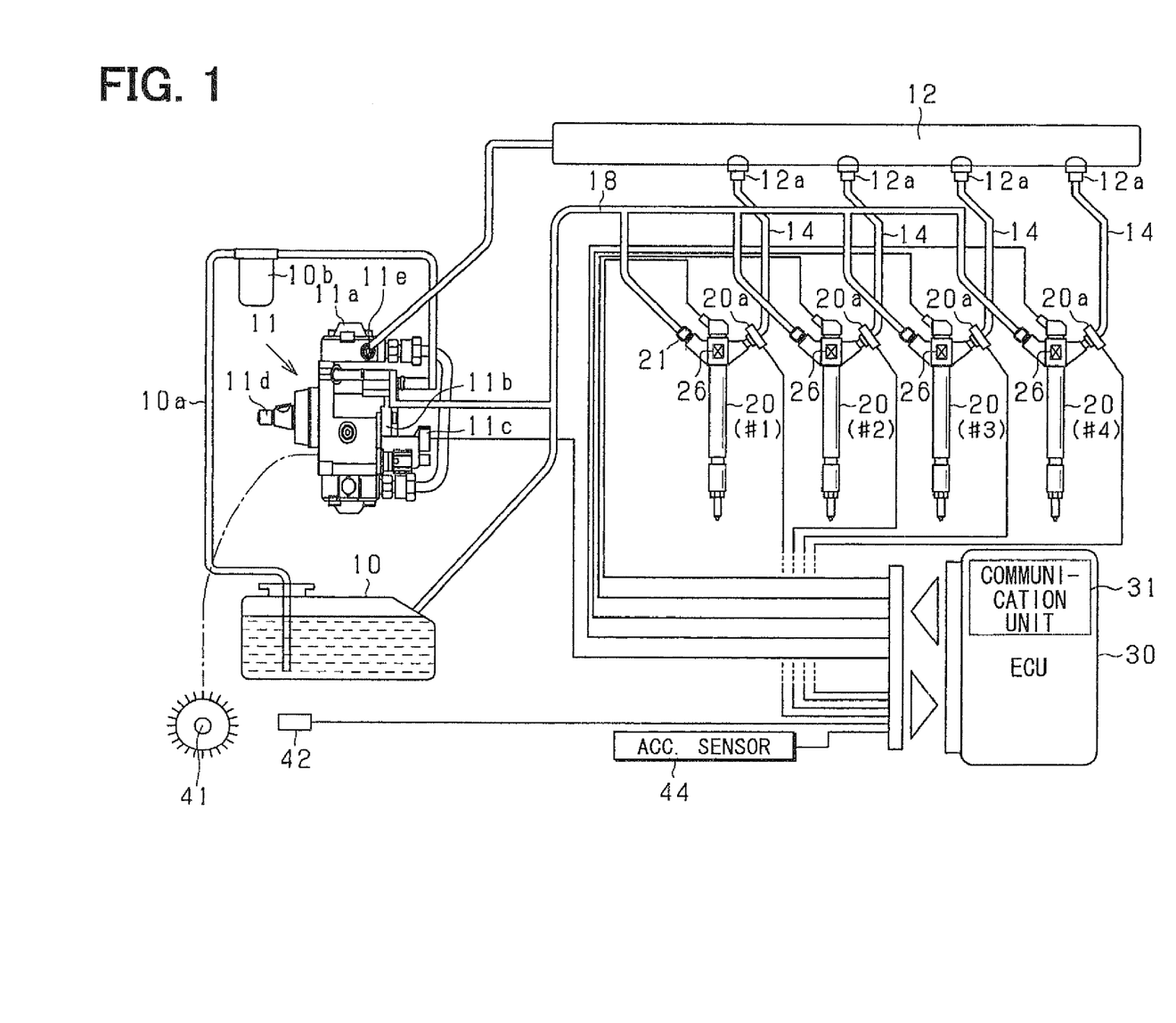
FIG. 1 is a schematic diagram showing an outline of a fuel injection device and an engine control system according to an embodiment.

First, the common-rail fuel injection system as an in-vehicle engine system according to the present embodiment is described with reference to FIG. 1. In the present embodiment, the engine is, for example, a multi-cylinder engine such as an inline four-cylinder engine. Specifically, the engine may be a four-stroke reciprocal diesel engine. In the present engine, an electromagnetic pickup as a cylinder-detection sensor is provided to a camshaft of an intake valve and an exhaust valve so as to successively determine an object cylinder at that time. Each of four cylinders #1 to #4 repeats four-stroke combustion cycles, each including an intake stroke, a compression stroke, a combustion stroke, and an exhaust stroke, at 720 degree CA (crank angle). In detail, the #1, #3, #4, #2 cylinders perform the four-stroke combustion cycle in this order at 180-degree-CA shift relative to each other. In FIG. 1, injectors 20 as fuel injection valves are respectively assigned to the cylinders #1, #2, #3, #4 from the side of a fuel tank 10.

As shown in FIG. 1, the present fuel injection system includes an electronic control unit (ECU) 30, which is configured to input detection signals, which are outputted from various sensors, and control components of a fuel supply system in accordance with the detection signals. The ECU 30 controls an electric current, which is supplied to a suction control valve 11c, thereby controlling an amount of fuel discharged from a fuel pump 11. The ECU 30 performs a feedback control such as PID control to regulate fuel pressure in a common rail 12 as a pressure-accumulation vessel at target fuel pressure. The pressure in the common rail 12 is detected using a pressure sensor 20a. The ECU 30 controls an amount of fuel injected into a specific cylinder of the engine based on the fuel pressure, thereby controlling rotation speed and torque of an output shaft of the engine.

The fuel tank 10, the fuel pump 11, the common rail 12, and the injectors 20 are arranged in this order from the upstream in the fuel supply system. The fuel tank 10 is connected with the fuel pump 11 through a fuel filter 10b and a pipe 10a.

The fuel tank 10 as a vessel is for storing fuel such as light oil for the engine. The fuel pump 11 includes a high-pressure pump 11a and a low-pressure pump 11b. The low-pressure pump 11b is configured to pump fuel from the fuel tank 10, and the high-pressure pump 11a is configured to further pressurize the fuel pumped from the low-pressure pump 11b. A suction control valve (SCV) 11c is provided in an inlet of the fuel pump 11 to control an amount of fuel fed to the high-pressure pump 11a. In the present structure, the suction control valve 11c controls an amount of fuel discharged from the fuel pump 11.

The suction control valve 11c is, for example, a normally-on regulating valve, which opens when being de-energized. In the present structure, an amount of fuel discharged from the fuel pump 11 can be regulated by controlling a drive current supplied to the suction control valve 11c so as to manipulate a valve-opening area of the suction control valve 11c.

The low-pressure pump 11b of the fuel pump 11 is, for example a trochoid feed pump. The high-pressure pump 11a is, for example, a plunger pump, which is configured to feed fuel from compression chambers by axially moving plungers successively at predetermined intervals by using an eccentric cam (not shown). The plungers may include three plungers, for example. The pumps are driven by using a driving shaft 11d. The driving shaft 11d is interlocked with a crankshaft 41, which is an output shaft of the engine. The driving shaft 11d is configured to rotate at a ratio such as one-to-one or one-to-two with respect to one rotation of the crankshaft 41, for example. In the present structure, the low-pressure pump lib and the high-pressure pump 11a are driven by the output power of the engine.

The fuel pump 11 pumps fuel from the fuel tank 10 through the fuel filter 10b and press-feeds the pumped fuel to the common rail 12. The common rail 12 stores the fuel, which is fed from the fuel pump 11, at high pressure. The common rail 12 distributes the accumulated fuel to the injector 20 of each of the cylinders #1 to #4 through a high-pressure pipe 14, which is provided to each cylinder. Each of the injectors 20(#1) to 20(#4) has an exhaust port 21, which is connected with a pipe 18 for returning excessive fuel to the fuel tank 10. An orifice 12a as a pulsation reducing unit is provided to a connection between the common rail 12 and the high-pressure pipe 14 for attenuating pulsation in pressure of fuel, which flows from the common rail 12 into the high-pressure pipe 14.

Figure 2:
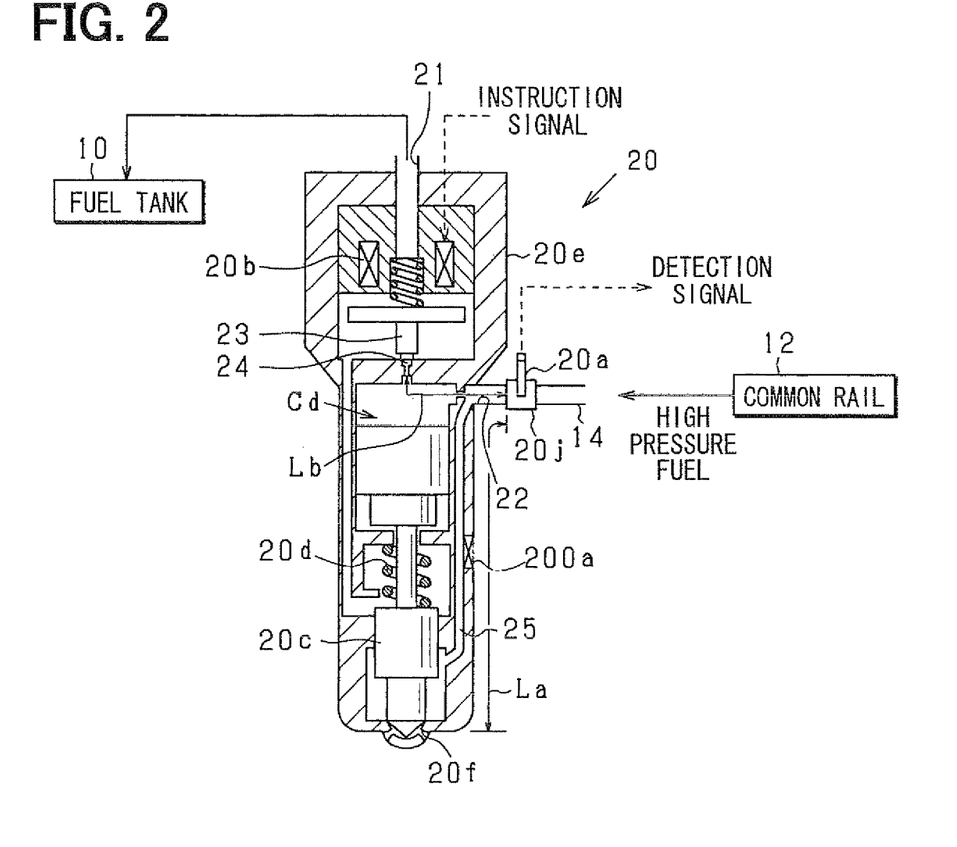
FIG. 2 is a schematic sectional view showing an internal structure of a fuel injection valve employed in the engine control system.

FIG. 2 shows a detailed structure of the injector 20. The four injectors 20(#1) to 20(#4) substantially has the same structure, which is, for example, the structure shown in FIG.

2. Each injector 20 is a fuel injection valve, which is hydraulically actuated using fuel, which is drawn from the fuel tank 10 and to be burned in the engine. In the injector 20, driving power for fuel injection is transmitted via a hydraulic pressure chamber Cd as a control chamber As shown in the FIG. 2, the injector 20 is configured as the normally-close fuel injection valve, which is in a closed state when being de-energized.

High-pressure fuel is supplied from the common rail 12, and the High-pressure fuel flows into a fuel inlet hole 22, which is provided in a housing 20e of the injector 20. The supplied high-pressure fuel partially flows into the hydraulic pressure chamber Cd, and remaining high-pressure fuel flows to nozzle holes 20f. The hydraulic pressure chamber Cd has a leak hole 24, which is opened and closed by a control valve 23. When the leak hole 24 is opened by lifting the control valve 23, fuel is returned from the hydraulic pressure chamber Cd to the fuel tank 10 through the leak hole 24 and the exhaust port 21.

In the fuel injection of the injector 20, the control valve 23 is operated according to the energization and de-energization of a solenoid 20b, which is a two-way solenoid valve, whereby the control valve 23 controls leakage of fuel from the hydraulic pressure chamber Cd. Thus, the control valve 23 controls pressure in the hydraulic pressure chamber Cd. Here, the pressure in the hydraulic pressure chamber Cd is equivalent to backpressure applied to a needle valve 20c. Thus, the needle valve 20c reciprocates upward and downward inside the housing 20e according to the change in pressure in the hydraulic pressure chamber Cd, while being applied with biasing force of a coil spring 20d. In the present operation, a fuel passage 25, which extends to the nozzle holes 20f, is opened and closed midway therethrough. Specifically, the fuel passage 25 has a tapered seat surface, and the needle valve 20c is seated to and lifted from the tapered seat surface in accordance with the reciprocation of the needle valve 20c, whereby the needle valve 20c communicates and blockades the fuel passage 25. The number of the nozzle holes 20f may be arbitrary determined.

The needle valve 20c is, for example, on-off controlled. Specifically, the needle valve 20c has the two-way solenoid valve as the actuator, which is applied with a pulse signal as an energization signal. The pulse signal as an ON-OFF signal is transmitted from the ECU 30 to energize and de-energize the solenoid valve, The needle valve 20c is lifted by turning on the pulse signal, thereby opening the nozzle holes 20f. The needle valve 20c is seated by turning off the pulse signal, thereby blockading the nozzle holes 20f.

The pressure in the hydraulic pressure chamber Cd is increased by supplying fuel from the common rail 12. On the other hand, the pressure in the hydraulic pressure chamber Cd is decreased by energizing the solenoid 20b to manipulate the control valve 23 so as to open the leak hole 24. In the present structure, fuel is returned from the hydraulic pressure chamber Cd to the fuel tank 10 through the pipe 18 (FIG. 1), which connects the injector 20 with the fuel tank 10. That is, the fuel pressure in the hydraulic pressure chamber Cd is controlled by manipulating the control valve 23, so that the needle valve 20c is operated for opening and closing the nozzle holes 20f.

In the present structure, the injector 20 includes the needle valve 20c, which is configured to open and close the injector 20 by opening and closing the fuel passage 25, which extends to the nozzle holes 20f, in conjunction with the predetermined axial reciprocation inside the housing 20e as the valve body. When the solenoid is de-energized, the needle valve 20c is displaced to a close side by being applied with the biasing force of the spring 20d, which is regularly exerted toward the close side. When the solenoid is energized, the needle valve 20c is displaced to an open side by being applied with the driving force against the biasing force of the spring 20d. The lift of the needle valve 20c when being energized is substantially symmetric with the lift of the needle valve 20c when being de-energized, The injector 20 is provided with the pressure sensor 20a (FIG. 1) for detecting fuel pressure. Specifically, the fuel inlet hole 22 of the housing 20e is connected with the high-pressure pipe 14 via a jig 20j. The pressure sensor 20a is attached to the jig 20j. Here, in a stage where the injector 20 is shipped from a factory, the injector 20 is attached with the Jig 20j, the pressure sensor 20a, and an IC memory 26 (FIGS. 1).

Thus, the fuel pressure as inlet pressure in the fuel inlet hole 22 can be arbitrary detected by the pressure sensor 20a, which is mounted to the fuel inlet hole 22 of the injector 20. Specifically, a fluctuation pattern of the fuel pressure attributed to fuel injection of the injector 20, a fuel pressure level (stable pressure), fuel injection pressure, and the like can be detected in accordance with the output of the pressure sensor 20a.

The pressure sensor 20a is provided to each of the injectors 20(#1) to 20(#4). In the present structure, the fluctuation pattern of the fuel pressure attributed to specific fuel injection of the injector 20 can be accurately detected based on the output of the pressure sensor 20a.

In addition, various kinds of sensors for a vehicle control other than the above-mentioned sensors are provided in a vehicle such as a four-wheel automobile or a track (not shown). For example, a crank angle sensor 42 such as an electromagnetic pick up is provided to the outer periphery of the crankshaft 41, which is an output shaft of the engine. The crank angle sensor 42 is configured to detect the rotation angle and the rotation speed of the crankshaft 41, which corresponds to the engine rotation speed. The crank angle sensor 42 is configured to output a crank angle signal at predetermined intervals such 30 degree-CA. An accelerator sensor 44 is provided to detect a manipulation, which corresponds to depression of an accelerator by a driver. The accelerator sensor 44 is configured to output an electric signal according to a state, which corresponds to the position of the accelerator.

The ECU 30 predominantly performs an engine control as a fuel injection device in the present system. The ECU 30 as an engine control ECU includes a generally-known microcomputer (not shown). The ECU 30 determines an operating state of the engine and an occupant's demand on the basis of the detection signals of the various sensors, thereby operating various actuators such as the suction control valve 11c and the injector 20 in response to the operating state and the occupant's demand. Thus, the ECU 30 performs various controls relating to the engine in optimal modes adaptively to the various conditions.

The microcomputer of the ECU 30 includes a CPU as a main processing unit, which performs various kinds of operations, a RAM as a main memory, which stores temporarily data, an operation result, and the like, a ROM as a program memory, an EEPROM as a data storage, a backup RAM, and the like. The backup RAM is a memory, which is regularly supplied with electric power from a backup power supply such as an in-vehicle battery even when the main power supply of the ECU 30 is terminated Various programs and control data maps relating to the fuel injection are stored in advance in the ROM and various control data including the design data of the engine are stored in the data storage memory such as the EEPROM.

In the present embodiment, the ECU 30 calculates demand torque, which is required to the crankshaft 41 as the output shaft, and fuel injection quantity for satisfying the demand torque, based on various kinds of sensor outputs as the detection signals, which are arbitrary transmitted to the ECU 30. In the present structure, the ECU 30 variably sets the fuel injection quantity of the injector 20, thereby controlling engine torque, which is generated through fuel combustion in the combustion chamber of each cylinder. Thus, the ECU 30 controls axial torque as output torque, which is actually outputted to the crankshaft 41, at the demand torque.

That is, the ECU 30 calculates, for example, the fuel injection quantity according to the engine operation state and manipulation of the accelerator by the driver, and the like at the time. The ECU 30 outputs the injection control signal (drive quantity) to the injector 20 so as to direct to inject fuel correspondingly to the fuel injection quantity at a predetermined injection timing. In the present operation, the output torque of the engine is controlled at a target value based on the drive quantity, which is, for example, an opening period of the injector 20.

As generally known, in a diesel engine, an intake throttle valve (throttle valve), which is provided in an intake passage of the engine, is held at a substantially full open state in a steady operation so as to further draw fresh air and to reduce pumping loss. Therefore, the fuel injection quantity is mainly manipulated for controlling a combustion state at the time of the steady operation. In particular, a combustion control related to a torque adjustment is mainly performed at the time of the steady operation.

Figure 3:
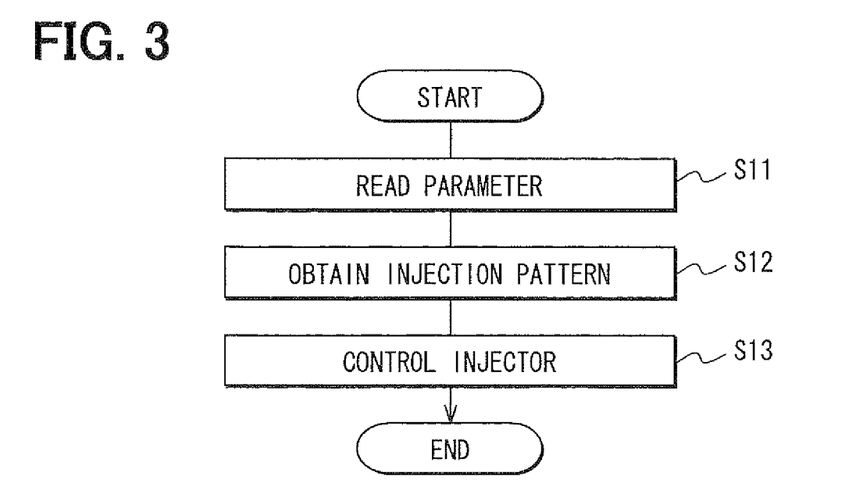
FIG. 3 is a flow chart showing an injection control according to the embodiment.

As follows, the fuel injection control according to the present embodiment is described with reference to FIG. 3. In this regard, the values of various parameters used in the processing shown in FIG. 3 are sequentially stored in the storage device, and are sequentially updated as needed. The storage device may be the RAM and the EEPROM mounted in the ECU 30, or the backup RAM. Basically, the series of processings in FIG. 3 is performed once per one burning cycle of for each cylinder of the engine. The processings in FIG. 3 is performed by executing the program stored in the ROM of the ECU 30. That is, by executing the present program, fuel supply to all the cylinders excluding an inactive cylinder is performed in a one burning cycle.

In the series of the present processing shown in FIG. 3, at step S11, predetermined parameters are read. The predetermined parameters may include the engine speed, the fuel pressure, an accelerator manipulation of the driver, and the like at that time. The engine speed may be obtained based on an actual measurement of the crank angle sensor 42. The fuel pressure may be obtained based on an actual measurement of the pressure sensor 20*a*. The accelerator manipulation may be obtained from an actual measurement of the accelerator sensor 44.

At subsequent step S12, an injection pattern is set up based on the various parameters, which are read at step S11. The injection patterns are variably determined according to the demand torque of the crankshaft 41, which is equivalent to the engine load at that time. For example, in a single-stage injection, the injection quantity (injection period) of the single-stage injection is variably determined as the injection pattern. Alternatively, in a multi-stage injection, the total injection quantity (the total injection period) of injections, which contribute to the engine torque, is variably determined as the injection pattern. Thus, a command value as an instruction signal for the injector 20 is set up based on the injection pattern. In the present structure, a pilot injection, a pre-injection, an after-injection, a post-injection, and the like are suitably performed with main injection according to the condition of the vehicle and the like.

The present injection pattern is obtained based on a predetermined data map such as a data map for the injection control and a correction coefficient stored in the ROM, for example. The predetermined data map may be substituted to an equation. Specifically, for example, an optimal injection pattern may be beforehand obtained in an assumed range of the predetermined parameter (step S11) by conducting an injection-pattern experiment. The obtained optimal injection pattern may be stored in the data map for the injection control. The present injection pattern is defined by parameters, such as an injection stage, the injection timing of each injection, and the injection period, for example. The injection stage is a number of injections in one burning cycle. The injection period is equivalent to the injection quantity. In this way, the injection control map indicates the relationship between the parameters and the optimal injection pattern.

The injection pattern, which is obtained from the injection control map, is corrected based on the correction coefficient. The correction coefficient is separately updated and stored in, for example, the EEPROM of the ECU 30. The correction coefficient (strictly, predetermined coefficient of multiple coefficients) is successively updated by a separate processing in an operation of the engine. In the correction, the target value is calculated by dividing a value on the map by the correction coefficient, for example. Thus, an injection pattern corresponding to the present condition can be obtained by the correction. Furthermore, the command signal for the injector 20 corresponding to the injection pattern can be also obtained.

In the setting of the injection pattern at step S12, data maps may be respectively created separately for the injection patterns, each including identical elements such as the injection stage. Alternatively, a data map may be created for the injection pattern, which includes some of or all the elements.

The injection pattern, which is set in this way, and the command value as the instruction signal, which corresponds to the injection pattern, are used at subsequent step S13. Specifically, at step S13, the injector 20 is controlled based on the command value as the instruction signal. In particular, the injector 20 is controlled according to the instruction signal outputted to the injector 20. The series of processings in FIG. 3 is terminated after performing the control of the present injector 20.

The injection control map used at S12 is defined based on an examination result, which is beforehand obtained through an examination in advance of the factory shipment of the injector 20, and an examination result, which is beforehand obtained through an examination in advance of the factory shipment of the pressure sensor 20*a*. In the examination of the injector 20, a relationship between change in injection rate in actual fuel injection and change in detected pressure of the pressure sensor 20*a* accompanied with the fuel injection is measured. In the examination of the pressure sensor 20*a*, the output characteristic of the detection signal of the pressure sensor 20*a* is measured, The detection signal of the pressure sensor 20*a* changes correspondingly to the fuel pressure.

The examination result is stored as injector-individual difference information of the injector 20 in the corresponding IC memory 26 (storage unit). The examination result of the pressure sensor 20*a* is stored as pressure-sensor-individual difference information in the corresponding IC memory 26. Then, each individual difference information is transmitted from each IC memory 26 to the ECU 30 through a communication unit 31 (FIGS. 1), which is provided to the ECU 30. The transmission may be a non-contact wireless transmission or a wired transmission. Subsequently, an injection control map is created or modified based on the injector-individual difference information and pressure-sensor-individual difference information.

Next, the examination for measuring the output characteristic of the pressure sensor 20a is described in detail with reference to FIGS. 4, 5.

The examination is performed before the factory shipment of the injector 20. First, as shown in FIG. 4A, the pressure sensor 20a as an examined object, a pressure generator 51, a detector 52, and a measuring instrument 53 are prepared, The pressure generator 51 is configured to generate desired fuel pressure as test pressure. The detector 52 obtains the detection signal of the pressure sensor 20a. The measuring instrument 53 includes a control unit, which is configured with a microcomputer and the like.

The pressure sensor 20a includes a sensor element 20s and an amplifying unit 20t. The sensor element 20s converts the fuel pressure into an electric signal. The amplifying unit 20t as a waveform processing unit receives the electric signal of the sensor element 20s. The amplifying unit 20t amplifies the input electric signal, thereby performing a waveform processing. The amplifying unit 20t outputs the amplified signal as the detection signal (output voltage) to a component outside the pressure sensor 20a. The pressure sensor 20a is connected with a fuel pipe 51a, which is provided to the pressure generator 51 for the examination. In the present structure, test pressure is actually applied to the pressure sensor 20a. The measuring instrument 53 outputs the instruction signal to the pressure generator 51 so as to instruct desired pressure such that the pressure generator 51 generates test pressure to control fuel pressure in the fuel pipe 51 a at the desired pressure based on the instruction signal.

Next, a first procedure and a second procedure are performed such that the pressure generator 51 controls the test pressure of fuel in the fuel pipe 51 a at the desired pressure. In the present operation, as shown in FIG. 4B, the test pressure is gradually and continuously changed. That is, the test pressure is not fixed at fixed pressure, but exerted with analog change. Specifically, the test pressure is alternately changed to continuously and repeatedly increase and decrease with respect to the reference pressure as a center value. In the example of FIG. 4B, the reference pressure is 80 MPa. In the example of FIG. 4B, the desired pressure is set in a pressure range between 70 MPa and 90 MPa, and the test pressure is exerted with the analog change in the pressure range. That is, the amplitude of the alternate change in test pressure is set at 20 MPa. In the present structure, the pressure sensor 20a outputs the detection signal according to the test pressure, which is exerted with the analog change in the range of 70 MPa to 90 MPa. Thus, as shown in FIG. 4C, the detection signal as the output voltage is also exerted with continuous analog change. The detection signal obtained by the detector 52 is outputted to the measuring instrument 53.

In the present operation and structure, the measuring instrument 53 is capable of obtaining the magnitude of fluctuation as the magnitude of change in test pressure in the range of 70 MPa to 90 MPa. The measuring instrument 53 is further capable of obtaining the magnitude of fluctuation as the magnitude of change in detection signal, which changes correspondingly to the fluctuation in test pressure. Thus, the measuring instrument 53 generates the information, which indicates the relationship between the magnitude of the fluctuation in test pressure and the magnitude of the fluctuation in detection signal, as the pressure-sensor-individual difference information. FIG. 5 is a flow chart showing a procedure of the generation of the pressure-sensor-individual difference information performed by the control unit of the measuring instrument 53. The present processing is, for example, repeated at a predetermined cycle through the acquisition of the detection signal, which is exerted with the analog change, while exerting the analog change to the test pressure using the measuring instrument 53. The predetermined cycle is preferably determined such that the analog change can be sufficiently recognized.

First, at step S10, it is determined whether the present test pressure, which is exerted with the analog change, is predetermined pressure, which is beforehand determined. In the example of FIG. 4, the predetermined pressure is 80 MPa. The present determination is performed based on the instruction signal with which the measuring instrument 53 instructs the desired pressure to the pressure generator 51. When the test pressure is determined to be the predetermined pressure at S10, a positive determination is made. In this case, the pressure fluctuations $\Delta P1$ and $\Delta P2$ (FIG. 4B) are calculated at step S20. The pressure fluctuations $\Delta P1$ and $\Delta P2$ (FIG. 4B) occur in a time period from the present time point to the time point at which the test pressure becomes the predetermined pressure at the next time. Each of the pressure fluctuations $\Delta P1$ and $\Delta P2$ is the maximum amplitude of the pressure fluctuation. The magnitude of fluctuation $\Delta V1$ and $\Delta V2$ (FIG. 4C) in output voltage is calculated at step S30. The magnitude of fluctuation $\Delta V1$ and $\Delta V2$ are attributed to the pressure fluctuation.

Figure 4A:
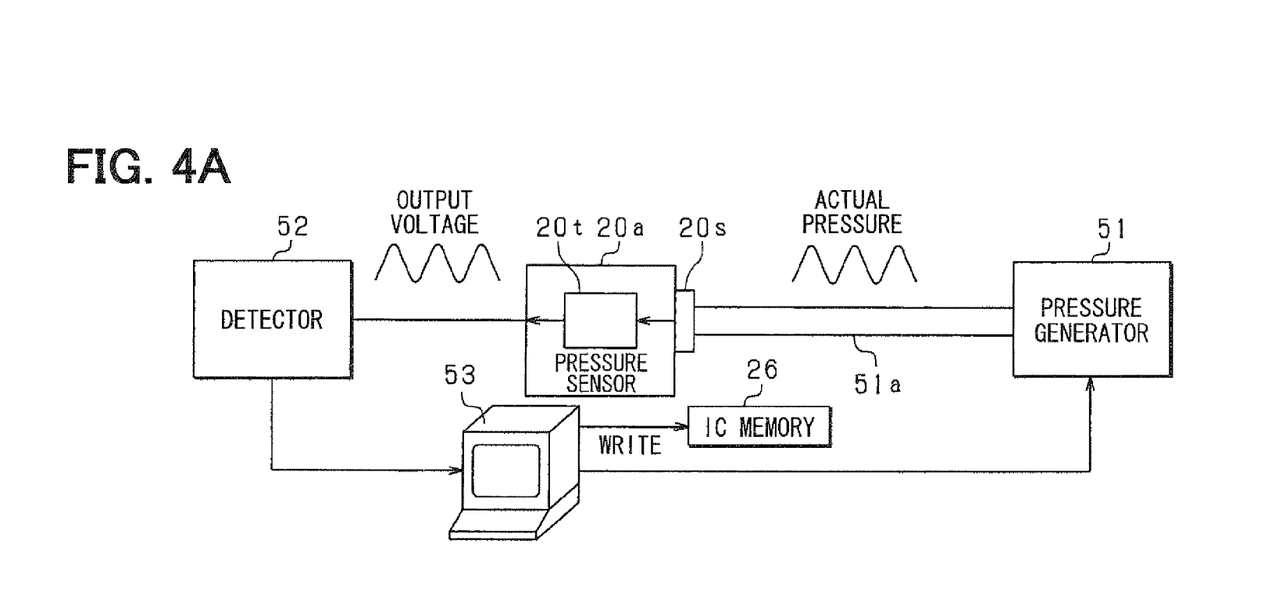
FIG. 4A is a diagram showing components for measurement and examination of an output characteristic of a pressure sensor related to present embodiment.
Figure 4B:
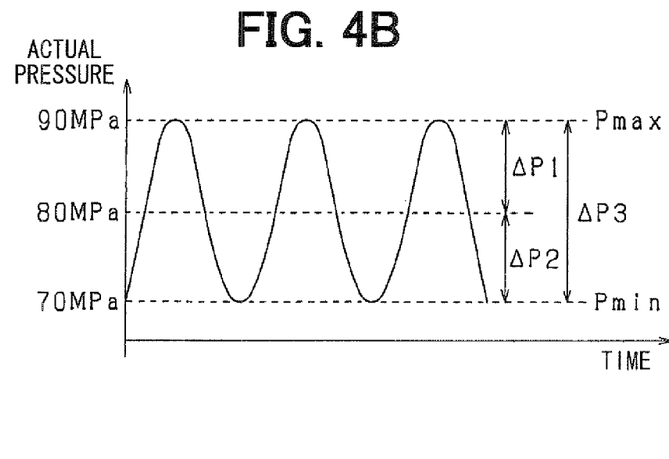
FIG. 4B is a time chart showing a change in fuel pressure used for the measurement and examination.
Figure 4C:
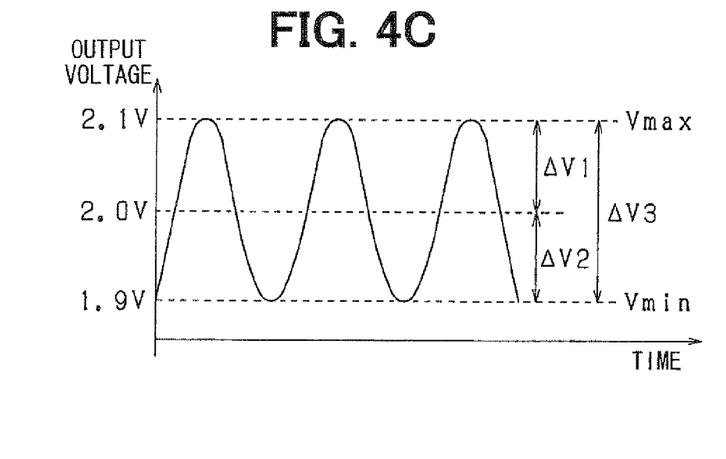
FIG. 4C is a time chart showing a change in output voltage obtained by the measurement and examination.
Figure 5:
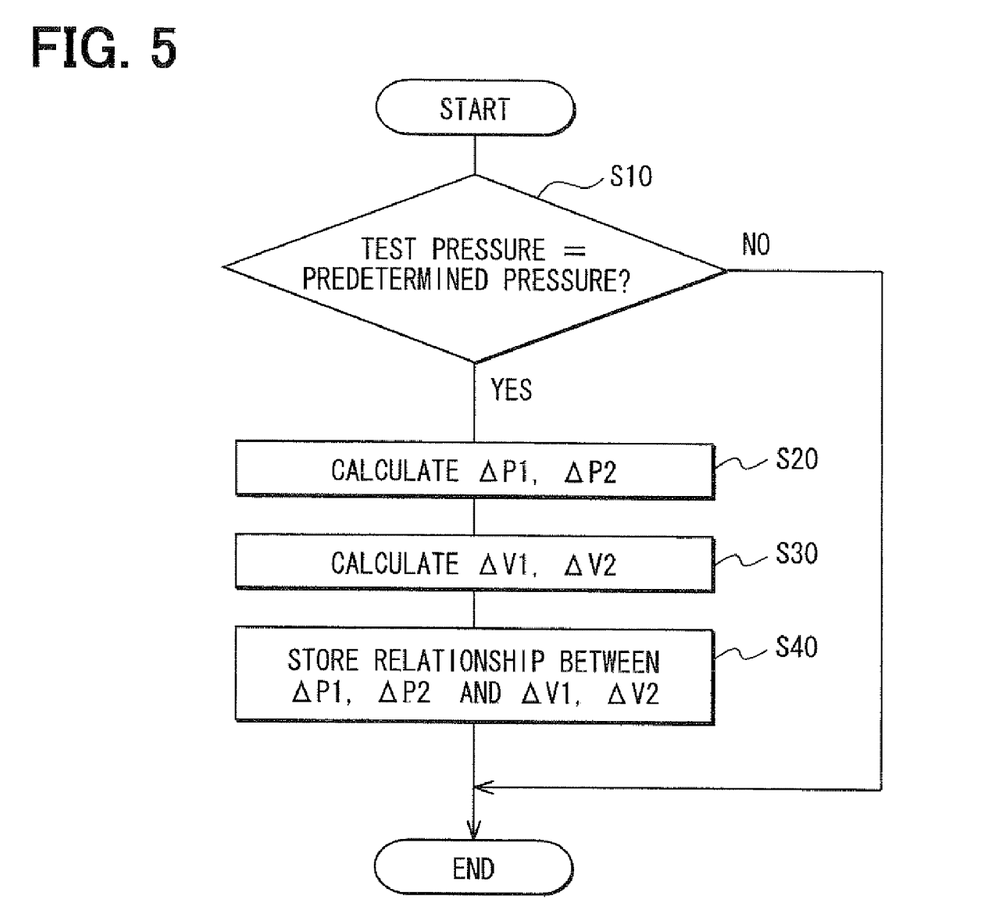
FIG. 5 is a flowchart showing a procedure executed by a control portion of a measurement device.

In the example of FIG. 4, the magnitude of fluctuation deltaP1 at the increase side with respect to the predetermined pressure of 80 MPa is +10 MPa, and the magnitude of fluctuation deltaP2 at the decrease side with respect to the predetermined pressure is −10 MPa. The output voltage at the time of predetermined pressure is 2.0V, and the voltage fluctuations $\Delta V1$ and $\Delta V2$ with respect to the pressure fluctuations $\Delta P1$ and $\Delta P2$ are respectively +0.1V and −0.1V. The predetermined pressure 80 MPa may be equivalent to first test pressure, and the maximum test pressure of 90 MPa and the minimum test pressure of 70 MPa may be equivalent to second test pressure.

Next, at step S40, a relationship between the pressure fluctuations $\Delta P1$ and $\Delta P2$, which are calculated at step S20, and the voltage fluctuations $\Delta V1$ and $\Delta V2$ which are calculated at step S30, is generated as pressure-sensor-individual difference information. Specifically, pressure-sensor-individual difference information, which defines the fluctuation of ±10 MPa in actual fuel pressure applied to the pressure sensor 20a with respect to the fluctuation of ±0.1V in output voltage, is stored in the IC memory 26 in a third procedure, The individual difference information may define a relationship of both the magnitude of fluctuation deltaP1 at the increase side and the magnitude of fluctuation deltaP2 at the decrease side. Alternatively, the individual difference information may define a relationship between averaged values of the absolute values of both the pressure fluctuation $\Delta P1$ and $\Delta P2$ and averaged values of the absolute values of both the voltage fluctuation $\Delta V1$ and $\Delta V2$. Alternatively, the individual difference information may define a relationship of either one of the pressure fluctuations $\Delta P1$ and $\Delta P2$.

As described above, this embodiment produces the following preferable effects.

(1) In the examination for measuring the output characteristic of the pressure sensor 20a, the test pressure, which is applied to the pressure sensor 20a, is fluctuated. Further, the IC memory 26 stores the pressure-sensor-individual difference information between the pressure fluctuations $\Delta P1$, $\Delta P2$ and the voltage fluctuations $\Delta V1$, $\Delta V2$ at the time. Therefore, an offset error of the test pressure and the like can be restricted from being reflected on the pressure-sensor-individual difference information, compared with a case where the test pressure applied to the pressure sensor 20a is fixed. Specifically, for example, an error can be reduced compared with a case where the relationship between a fixed value such as 80 MPa of the test pressure and a fixed value such as 2.0V of the measured detection signal of the pressure sensor 20a is defined as the pressure-sensor-individual difference information. Therefore, accuracy of the injection control map created using the pressure-sensor-individual difference information can be enhanced. Thus, the injection state of the fuel injection valve can be controlled with high accuracy.

(2) The injector-individual difference information is stored in the IC memory 26. The injector-individual difference information indicates a relationship between the change in injection rate in actual fuel injection of the injector 2 and the change in detected pressure of the pressure sensor 20a accompanied with the fuel injection. Therefore, the injector-individual difference information can be reflected on the injection control map, and the injection control can be performed in accordance with the present injection control map. Therefore, according to the present embodiment, the injection state of the injector 20 can be controlled with high accuracy, compared with a conventional device, which stores the Tq-Q characteristic as individual difference information and performs an injection control using the pre-stored Tq-Q characteristic.

(3) The pressure sensor 20a is mounted to the injector 20. Therefore, the pressure sensor 20a, which is used in the injection characteristic examination before the factory shipment, can be restricted from being mounted to an injector 20, which is other than the corresponding injector 20. Specifically, for example, the pressure sensor 20a, which corresponds to the injector 20(#1) can be restricted from being mounted to one of the injector 20(#2) to 20(#4). Thus, an erroneous assembly can be restricted. In addition, in the present structure, the location of the pressure sensor 20a is closer to the nozzle holes 20f, compared with the structure in which the pressure sensor 20a is mounted to the high-pressure pipe 14, which connects the common rail 12 with the injector 20. Therefore, the pressure fluctuation at the nozzle holes 20f can be further accurately detected, compared with a structure in which the pressure fluctuation, which has been attenuated through the high-pressure pipe 14, is detected.

(Other Embodiments)

The present invention is not limited to the above embodiments. The features of the embodiments may be arbitrarily combined.

According to the above embodiments, the test pressure is actually applied to the sensor element 20s of the pressure sensor 20a, and the detection signal as the output voltage at that time is obtained and examined in the examination for measuring the output characteristic of the pressure sensor 20a. Alternatively, an test electric signal, which corresponds to the test pressure, may be transmitted to the amplifying unit 20t, and the detection signal as the output voltage at that time may be obtained and examined, instead of actually applying the test pressure. In this case, the test electric signal may be alternately changed, similarly to the above embodiment in which the test pressure is alternately changed, In this case, the pressure-sensor-individual difference information may indicate the relationship between the change in test electric signal and the change in detection signal attributed to the change in test electric signal. Alternatively, the pressure-sensor-individual difference information may indicate the relationship between pressure change corresponding to the change in test electric signal and the change in detection signal attributed to the change in test electric signal.

Further, in the case where the pressure-sensor-individual difference information indicates the relationship between the change in test electric signal and the change in detection signal, the change in detection signal may be converted to change in fuel pressure, which corresponds to the change in detection signal in the creating of the injection control map based on the pressure-sensor-individual difference information. In this case, an injection control map may be created based on the relationship between the converted pressure change and the change in detection signal.

According to the above embodiment, the analog change is continuously exerted to the test pressure in the examination for measuring the output characteristic of the pressure sensor 20a. Alternatively, the test pressure may be exerted with stepwise change as described below. For example, the test pressure may be set at first fixed test pressure such as 80 MPa, and the measuring instrument 53 may obtain the detection signal as the output voltage such as 2.0V of the pressure sensor 20a at that time. Subsequently, the test pressure may be set at second fixed test pressure such as 90 MPa, and the measuring instrument 53 may obtain the detection signal as the output voltage such as 2.1V of the pressure sensor 20a at that time. The test pressure may be, for example, stepwise changed from the first test pressure to the second test pressure. The operation of the pressure generator may be terminated in a time period between generating of the first test pressure and generating of the second test pressure. In the present operation, the relationship between the pressure change (90 Mpa−80 MPa=10 MPa) and the change in output voltage (2.1V−2.0V=0.1V) corresponding to the pressure change can be obtained.

In the generating of the desired fuel pressure by using the pressure generator 51, a deviation as an offset error may occur in the actual pressure with respect to the target pressure. When the test pressure is stepwise changed as described above, the offset error in the first test pressure may be possibly different from the offset error in the second test pressure. As a result, the offset error may be highly reflected on the pressure-sensor-individual difference information.

On the contrary, as described above with reference to FIG. 4, the offset error of the test pressure related to the first test pressure can be brought close to the offset error of the test pressure related to the second test pressure by exerting the analog change to the test pressure. Thus, the target change in test pressure can be brought close to the actual change in test pressure. Therefore, the offset error can be restricted from being reflected on the pressure-sensor-individual difference information.

According to the above embodiment, the change in the output voltage (2.0V) caused by the pressure fluctuation with respect to the predetermined pressure (80 MPa) is calculated, and the voltage fluctuations ΔV1 and ΔV2 are obtained. Alternatively, a maximum value Vmax and a minimum value Vmin of the output voltage may be obtained by using the measuring instrument 53, and a voltage fluctuation deltaV3 may be calculated from the maximum value Vmax and the minimum value Vmin. In this case, the pressure fluctuation deltaP3 may be calculated from the maximum value Pmax and the minimum value Pmin. Thus, a relationship between the pressure fluctuation deltaP3 and the voltage fluctuation deltaV3 may be stored as the pressure-sensor-individual difference information.

In the examination shown in FIG. 4, the pressure is fluctuated in the range of 70 MPa to 90 MPa. Alternatively, the same examination may be conducted with respect to various kinds of ranges of the pressure fluctuation. In this case, the pressure-sensor-individual difference information may indicate relationships between the pressure fluctuations and the voltage fluctuations with respect to various kinds of ranges. That is, the predetermined pressure is not limited to 80 Mpa, and may be arbitrary determined in the examination. For example, the predetermined pressure may be set at fuel pressure such as 30 MPa at the time of the idling operation of the internal combustion engine or an upper limit such as 200 MPa of the fuel pressure.

As described in the above embodiment, the alternate change is exerted to the test pressure so as to repeatedly and continuously increase and decrease with respect to the reference pressure such as 80 MPa in the example of FIG. 4B. Alternatively, the examination may be carried out for two or more times with respect to various kinds of reference pressure. The examination may be carried out for two or more times with respect to various kinds of amplitudes. The examination may be carried out for two or more times with respect to various kinds of frequency. In this case, for example, the examination results obtained in the different conditions may be stored as the pressure-sensor-individual difference information.

As described above, the injection state such as change in injection rate at the time of the engine operation can be controlled accurately based on the change in injection pressure, compared with the control based on the injection pressure. In this case, the injection pressure gradually and continuously changes at fluctuation speed per unit time. The fluctuation speed (assumed fluctuation speed), which is change in test pressure per unit time, is preferably set at fluctuation speed, which is assumed in an actual engine operation. In this case, the examination can be performed in the state close to an actual state, in which the pressure sensor is used in the actual engine operation. Thus, preferably examination result can be obtained.

The assumed fluctuation speed, which is assumed in the actual engine operation, may be fluctuation speed of decrease in detected pressure of the pressure sensor 20a, the decrease being attributed to fuel injection through the nozzle holes 20f. Alternatively, the assumed fluctuation speed may be fluctuation speed of increase in detected pressure of the pressure sensor 20a, the increase being attributed to end of the fuel injection.

In the examination shown in FIG. 4, the pressure fluctuation is 10 MPa. Alternatively, the same examination may be conducted with respect to multiple pressure fluctuations. In this case, the pressure-sensor-individual difference information may indicate relationships between the voltage fluctuations with respect to the multiple pressure fluctuations.

Variation in change in output voltage may be stored in the IC memory 26 as the pressure-sensor-individual difference information. Specifically, for example, when the examination in FIG. 4 is conducted for multiple times under the same condition, variation may be caused in the obtained result of the change in the output voltage. For example, such a variation may be combined with the pressure-sensor individual difference information, which indicates the relationship between the change in pressure and the change in the output voltage, and the combined information may be stored.

In the embodiment, the IC memory 26 is employed as the storage unit (memory unit) for storing the individual difference information. Alternatively, another memory storage such as a device using the QR code (registered trademark), may be employed as the storage unit.

In the above embodiments, the IC memory 26 as the storage unit is mounted to the injector 20. Alternatively, the IC memory 26 may be mounted to a component other than the injector 20. Preferably, at the time of the factory shipment of the injector 20, the injector 20 is integrally mounted with the storage unit.

The injector 20 may be provided with a piezo actuator, instead of the solenoid actuator shown in FIG. 2. A direct-acting injector may be also used. The direct-acting injector is operated without pressure leak from the leak hole 24 or the like, and a hydraulic pressure chamber Cd is not used to transmit driving power. The direct-acting injector may be a direct-acting piezo injector developed in recent years, for example. When the direct-acting injector is employed, the injection rate can be easily controlled.

In the above embodiments, the pressure sensor 20a is mounted to the fuel inlet hole 22 of the injector 20. Alternatively, as shown by the dashed dotted line 200a in FIG. 2, a pressure sensor 200a may be mounted to the inside of the housing 20e, and fuel pressure in the fuel passage 25, which extends from the fuel inlet hole 22 to the nozzle holes 20f, may be detected Further in the case where the fuel inlet hole 22 is mounted with the pressure sensor as described above, the mounting structure of the pressure sensor 20a can be simplified, compared with the structure in which the inside of the housing 20e is mounted with the pressure sensor. On the other hand, in the structure in which the inside of the housing 20e is mounted with the pressure sensor, the location of the pressure sensor 20a is closer to the nozzle holes 20f, compared with the structure in which the fuel inlet hole 22 is mounted with the pressure sensor. Tnerefore, pressure fluctuation in the nozzle holes 20f can be further properly detected.

The pressure sensor 20a may be mounted to the high-pressure pipe 14. In this case, the pressure sensor 20a is preferably mounted to the location at a predetermined distance from the common rail 12.

A flow regulating unit may be provided to a connection between the common rail 12 and the high-pressure pipe 14 for regulating fuel flow from the common rail 12 to the high-pressure pipe 14. The present flow regulating unit is configured to blockade the passage when excessive fuel outflow is caused by, for example, fuel leak due to damage in the high-pressure pipe 14, the injector 20, or the like. For example, the flow regulating unit may be a valve element such as a ball element, which is configured to blockade the passage in the case of excessive flow. A flow damper, which is constructed by integrating the orifice 12a with the flow regulating unit, may be employed.

The pressure sensor 20a may be located downstream of the orifice and the flow regulating unit at the side closer to the nozzle holes 20f with respect to the fuel flow. Alternatively, the pressure sensor 20a may be located downstream of at least one of the orifices and the flow regulating unit.

The number of the fuel pressure sensor 20a may be arbitrary determined. For example, two or more sensors may be provided to a fuel passage for one cylinder. In the above embodiments, the pressure sensor 20a is provided to each cylinder. Alternatively, the pressure sensor 20a may be provided to only a part of the cylinders. For example, the pressure sensor 20a may be provided to only one cylinder. In this case, fuel pressure for other cylinders may be estimated based on the sensor output of the pressure sensor 20a.

In the obtaining of the sensor output of the pressure sensor 20a by using the measuring instrument 53 in the examination or by using the ECU 30 in an operation of the internal combustion engine at the time of injection control, the sensor output is may be obtained at an interval. Specifically, the interval is, for example, 50 microseconds. The interval is, preferably, less than 50 microseconds so as to obtain the tendency of the pressure fluctuation. The interval may be 20 microseconds, for example.

The type of the engine and the system configuration as the controlled object may be also arbitrary changed according to the application or the like. According to the embodiments, the device and system are applied to the diesel engine as one example. Alternatively, the device and system are applicable to a spark ignition gasoline engine, in particular a direct-injection engine, for example. In a fuel injection system for a direct fuel-injection gasoline engine, a delivery pipe is provided for storing gasoline at high-pressure. In this case, high-pressure fuel is fed from the fuel pump to the delivery pipe, and the high-pressure fuel is distributed from the delivery pipe to the multiple injectors 20 and injected into the combustion chambers of the engine. In such a system, the delivery pipe is equivalent to the pressure-accumulation vessel. The device and system are not limited to be used for the control of a fuel injection valve, which injects fuel directly in a cylinder. The device and system may be used for a fuel injection valve, which injects fuel to an engine intake passage or an exhaust passage.

As described above, according to the above embodiment, the relationship between the change in test pressure and the change in detection signal is defined as the individual difference information, The test pressure is actually applied to the pressure sensor (20*a*) in the examination. The change in detection signal is attributed to the change in test pressure. Therefore, an examination condition error can be restricted from being reflected on the individual difference information, compared with a case where the relationship between the absolute value of the test pressure and the measured detection signal as an output absolute value is defined as the individual difference information. The reason is described as follows In the following description, the fuel injection device, in which the relationship between the absolute value of test pressure and the measured detection signal is stored as the individual difference information, is defined as a comparative device.

An example case where the offset error occurs in actual test pressure, which is 81 MPa with respect to target test pressure 80 MPa, is described below. According to the present assumption, in the comparative device, a detection signal such as 2.01V corresponding to 81 MPa may be stored as the individual difference information, even though a detection signal such as 2.00V corresponding to 80 MPa is supposed to be stored.

On the contrary, according to the present aspect, the relationship between the change in test pressure and change in detection signal is defined as the individual difference information. For example, a target change in test pressure is set at 10 MPa. In this case, even when actual test pressure changes from 81 MPa to 91 MPa with respect to the target test pressure changing from 80 MPa to 90 MPa, the actual change of 10 MPa in test pressure between 81 MPa and 91 MPa coincides with the target change of 10 MPa in test pressure between 80 MPa and 90 MPa. Therefore, an offset error can be restricted from being reflected on the individual difference information.

Similarly, various kinds of examination condition errors other than the offset error in test pressure are also restricted from being reflected on the test pressure and the change in detection signal, compared with the case where the absolute value of the test pressure and the detection signal as the output absolute value are used. As described above, according to the present aspect, in which the relationship between the change in test pressure and the change in detection signal is defined as the individual difference information, an error can be less reflected on the individual difference information.

Here, even when the change in test pressure is constant, in the case where the range of the change in test pressure differs, the change in detection signals may differ correspondingly to the change in range. According to the above embodiment, the examination is conducted with respect to each of multiple ranges of the change in test pressure. The individual difference information is configured to indicate a relationship between the change in test pressure and the change in detection signal with respect to each of the multiple ranges. Therefore, reliability of the individual difference information can be enhanced irrespective of the range of the change in test pressure.

According to the above embodiment, the pressure sensor (20*a*) includes the sensor element (20*s*) and the waveform processing unit (20*t*). The sensor element (20*s*) is configured to convert the pressure of fuel into an electric signal. The waveform processing unit (20*t*) is configured to input the electric signal, perform a waveform processing of the electric signal, and output the detection signal. The individual difference information is configured to indicate one of: a relationship between change in test electric signal, which the waveform processing unit (20*t*) inputs in the examination, and change in detection signal, which is attributed to the change in test electric signal; and a relationship between change in pressure, which corresponds to the change in test electric signal, and the change in detection signal, which is attributed to the change in test electric signal.

Here, the offset error may arise in the test electricity signal through the examination, in which the waveform processing unit inputs the test electricity signal, similarly to the offset error in the test pressure. In the present structure, the relationship between the change in test electric signal or the change in pressure, which corresponds to the change in test electric signal, and the change in detection signal is defined as the individual difference information. Therefore, an examination condition error can be restricted from being reflected on the individual difference information, compared with a case where the relationship between the absolute value of the test pressure and the measured detection signal as the output absolute value is defined as the individual difference information.

According to the above embodiment, the examination is conducted with respect to each of multiple ranges of the change in test electric signal. The individual difference information is configured to indicate a relationship between the change in test electric signal and the change in detection signal with respect to each of the multiple ranges. Therefore, reliability of the individual difference information can be enhanced irrespective of the range of the change in test pressure.

According to the above embodiment, the fuel injection valve (20) is configured to inject fuel, which is distributed from a pressure-accumulation vessel (12). The pressure sensor (20*a*) is located in a fuel passage (25), which extends from the pressure-accumulation vessel (12) to a nozzle hole (20*f*) of the fuel injection valve (20), and configured to detect pressure of fuel, the pressure sensor (20*a*) being located closer to the nozzle hole (20*f*) than the pressure-accumulation vessel (12).

Pressure of fuel in the nozzle hole of the fuel injection valve is changed through the injection of fuel. In such a nozzle hole, pressure fluctuation has a high correlation with the injection state such as the actual injection start point, the maximum injection rate reach point, and the like. The inventor noted the present subject and conducted a study to specifically detect the injection state other than the injection quantity Q by detecting the pressure fluctuation. However, when the pressure sensor as the rail pressure sensor is attached to the pressure-accumulation vessel, the pressure fluctuation attributed to injection may be decreased within the pressure-accumulation vessel. Therefore, it is difficult to detect the pressure fluctuation with sufficient accuracy in such a pressure sensor.

According to the above embodiment, the pressure sensor is located in the fuel passage, which extends from the pressure-accumulation vessel to the nozzle hole of the fuel injection valve. The pressure sensor is located closer to the nozzle hole than the pressure-accumulation vessel. Therefore, the pressure sensor is capable of detecting pressure in the nozzle hole, before the pressure is attenuated in the pressure-accumulation vessel Therefore, the change in pressure attributed to the injection can be detected with sufficient accuracy. Thus, the injection state can be specifically detected based on the detection result. Therefore, in controlling of the injection quantity Q by controlling the opening period Tq of the fuel injection valve, the state of change in injection rate as the fuel quantity injected per unit time within one injection can be specifically controlled by controlling a time point, at which the actual injection starts, a time point, at which the injection rate becomes maximum, and the like, in addition to controlling the injection quantity, for example.

It is effective to obtain the change in pressure within one injection and control the injection state based on the change in pressure so as to specifically control the injection state such as the change in injection rate. That is, the inventor found that the injection state such as change in injection rate can be controlled accurately based on the change in injection pressure, compared with the control based on the injection pressure, and that processing load in the control can be also reduced.

According to the above embodiment, the change in test pressure and change in detection signal are stored as the individual difference information. Therefore, the injection state can be accurately controlled, and the processing load can be reduced.

According to the above embodiment, the pressure sensor is provided to the fuel injection valve. Therefore, in the present structure, the location of the pressure sensor is closer to the nozzle hole, compared with the structure in which the pressure sensor is mounted to the high-pressure pipe, which connects the pressure-accumulating vessel with the injector. Therefore, pressure fluctuation at the nozzle holes can be further accurately detected, compared with a structure in which the pressure fluctuation, which has been attenuated through the high-pressure pipe, is detected.

According to the above embodiment, the pressure sensor ($20a$) is located at the fuel inlet hole ($22$) of the fuel injection valve ($20$). Alternatively, the pressure sensor ($20a$) is located in the fuel injection valve ($20$) for detecting pressure of fuel in the inner fuel passage ($25$), which extends from the fuel inlet hole ($22$) to the nozzle hole ($20f$).

In the case where the fuel inlet hole is mounted with the pressure sensor as described above, the mounting structure of the pressure sensor can be simplified, compared with the structure in which the inside of the fuel injection valve is mounted with the pressure sensor. On the other hand, in the structure in which the inside of the fuel injection valve is mounted with the pressure sensor, the location of the pressure sensor is closer to the nozzle holes, compared with the structure in which the fuel inlet hole is mounted with the pressure sensor. Therefore, pressure fluctuation in the nozzle holes can be further properly detected.

According to the above embodiment, the orifice ($12a$) is located in a fuel passage ($25$), which extends from the pressure-accumulation vessel ($12$) to the fuel inlet hole ($22$) for attenuating pulsation in pressure of fuel flowing from the pressure-accumulation vessel ($12$). The pressure sensor ($20a$) is located downstream of the orifice ($12a$) with respect to fuel flow. In the case where the pressure sensor is located upstream of the orifice, fluctuation in pressure, which has been attenuated through the orifice, is detected. By contrast, according to the above embodiment, the pressure sensor is located downstream of the orifice. Therefore, pressure fluctuation can be detected before being attenuated through the orifice. Therefore, pressure fluctuation in the nozzle hole can be further properly detected.

According to the above embodiment, the storage unit is an integrated circuit memory (IC memory). Therefore, the storage unit can be increased in storage capacity, compared with the QR code (registered trademark). Therefore, the storage unit is capable of storing a large amount of information and suitable for increased information.

According to the above embodiment, a method for examining the fuel injection system, which includes the fuel injection valve ($20$), the pressure sensor ($20a$) for outputting the detection signal, the storage unit ($26$) for storing individual difference information, and the control unit for controlling the fuel injection valve ($20$) based on the stored individual difference information and the detection signal, the method including applying test pressure including first and second test pressure to the pressure sensor ($20a$) so as to obtain first and second detection signals, which respectively correspond to the first and second test pressure. The method further includes calculating the difference between the first and second test pressure as the test pressure change. The method further includes calculating the difference between the first and second detection signals as the detection signal change. The method further includes storing individual difference information, which indicates the relationship between the test pressure change and the detection signal change, as an output characteristic of the detection signal in the storage unit ($26$).

In the present method, the relationship between the change in test pressure and the change in detection signal is defined as the individual difference information. Therefore, an examination condition error can be restricted from being reflected on the individual difference information, compared with a case where the relationship between the absolute value of the test pressure and the measured detection signal as an output absolute value is defined as the individual difference information.

As described above, the injection state such as change in injection rate can be controlled accurately based on the change in injection pressure, compared with the control based on the injection pressure. In an engine operation, the injection pressure does not change stepwise but gradually and continuously changes. Therefore, according to the above embodiment, the applying includes gradually and continuously changing the test pressure from the first test pressure to the second test pressure. Therefore, the examination can be conducted in the condition where the pressure sensor is actually used in an operation of the internal combustion engine and the injection pressure is continuously and gradually changed. Therefore, a preferable examination result can be obtained.

According to the above embodiment, the test pressure is alternately changed so as to repeat increasing and decreasing with respect to reference pressure. The first test pressure may be the reference pressure, and the second test pressure may be one of a maximum amplitude and a minimum amplitude of the alternate change in test pressure According to the above embodiment, the method for examining the fuel injection system, which includes the fuel injection valve ($20$) for injecting fuel, the sensor element ($20s$) for converting pressure of the fuel into an electric signal, the waveform processing unit (20t) for performing the waveform processing of the electric signal to the detection signal, the storage unit (26) for storing individual difference information, and the control unit for controlling the fuel injection valve (20) based on the stored individual difference information and the detection signal, the method including applying test electric signal including first and second test electric signals to the waveform processing unit (20t) so as to obtain first and second detection signals, which respectively correspond to the first and second electric signals. The method further includes calculating the difference between the first and second electric signals as the test electric signal change. The method further includes calculating the difference between the first and second detection signals as the detection signal change. The method further includes storing individual difference information, which indicates the relationship between the test electric signal change and the detection signal change, as the output characteristic of the detection signal in the storage unit (26).

In the present method, the relationship between the change in test electric signal and the change in detection signal is defined as the individual difference information. Therefore, an examination condition error can be restricted from being reflected on the individual difference information, compared with a case where the relationship between the absolute value of the test electric signal and the measured detection signal as an output absolute value is defined as the individual difference information.

According to the above embodiment, the applying includes gradually and continuously changing the test electric signal from the first test electric signal to the second test electric signal. Therefore, the examination can be conducted in the condition where the pressure sensor is actually used in an operation of the internal combustion engine and the injection pressure is continuously and gradually changed. Therefore, a preferable examination result can be obtained.

According to the above embodiment, the gradually and continuously changing includes alternately changing the test electric signal so as to repeat increasing and decreasing with respect to a reference electric signal. The first test electric signal may be the reference electric signal, and the second test electric signal is one of a maximum amplitude and a minimum amplitude of the alternate change.

The above processings such as calculations and determinations are not limited being executed by the ECU 30. The control unit may have various structures including the ECU 30 shown as an example, The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A fuel injection device comprising:
a fuel injection valve for injecting fuel distributed from a pressure-accumulation vessel pressure-accumulating fuel;
a pressure sensor located in a fuel passage from the pressure-accumulation vessel to a nozzle hole of the fuel injection valve and closer to the nozzle hole than the pressure-accumulation vessel, the pressure sensor configured to output a detection signal correspondingly to pressure of the fuel; and
a storage unit for storing individual difference information, which indicates an output characteristic of the detection signal obtained by an examination, wherein
the individual difference information is:
information indicating a relationship between change in test pressure and change in detection signal, the test pressure is actually applied to the pressure sensor in the examination, and the change in detection signal is attributed to the change in the test pressure,
information indicating a relationship between the change in the test pressure and the change in the detection signal with respect to each of a plurality of changing ranges, the relationship being obtained by changing the test pressure in the plurality of changing ranges different from each other, and
information indicating a relationship between the change in the test pressure and the change in the detection signal, the relationship being obtained by alternately changing the test pressure at a changing speed corresponding to a changing speed when the detection signal changes attributed to start or end of fuel injection from the injection nozzle.

2. The fuel injection device according to claim 1, wherein the pressure sensor is provided to the fuel injection valve.

3. The fuel injection device according to claim 2, wherein the pressure sensor is located at a fuel inlet hole of the fuel injection valve.

4. The fuel injection device according to claim 2, wherein the pressure sensor is located in the fuel injection valve and configured to detect pressure of fuel in an inner fuel passage from the fuel inlet hole of the fuel injection valve to the nozzle hole.

5. The fuel injection device according to claim 1, further comprising:
an orifice located in a fuel passage from the pressure-accumulation vessel to a fuel inlet hole of the fuel injection valve for attenuating pulsation in pressure of fuel flowing from the pressure-accumulation vessel,
wherein the pressure sensor is located downstream of the orifice with respect to fuel flow.

6. The fuel injection device according to claim 1, wherein the storage unit is an IC memory.

7. A fuel injection device comprising:
a fuel injection valve for injecting fuel distributed from a pressure-accumulation vessel pressure-accumulating fuel;
a pressure sensor located in a fuel passage from the pressure-accumulation vessel to a nozzle hole of the fuel injection valve and closer to the nozzle hole than the pressure-accumulation vessel, the pressure sensor configured to output a detection signal correspondingly to pressure of the fuel; and
a storage unit for storing individual difference information, which indicates an output characteristic of the detection signal obtained by an examination, wherein the pressure sensor includes a sensor element and a waveform processing unit, the sensor element is configured to convert the pressure of fuel into an electric signal, the waveform processing unit is configured to input the electric signal, perform a waveform processing of the electric signal, and output the detection signal, the individual difference information is:

information indicating a relationship between change in a test electric signal, which the waveform processing unit inputs in the examination or change in pressure equivalent to the change, and change in the detection signal, which is attributed to the change in the test electric signal, information indicating a relationship between the change in the test electric signal and the change in detection signal, with respect to each of a plurality of changing ranges, the relationship being obtained by changing the change in the test electric signal in the plurality of changing ranges different from each other, and information indicating a relationship between the change in the test electric signal and the change in the detection signal, the relationship being obtained by alternately changing the test electric signal at a changing speed corresponding to a changing speed when the detection signal changes attributed to start or end of fuel injection from the injection nozzle.

8. The fuel injection device according to claim 7, wherein the pressure sensor is provided to the fuel injection valve.

9. The fuel injection device according to claim 8, wherein the pressure sensor is located at a fuel inlet hole of the fuel injection valve.

10. The fuel injection device according to claim 8, wherein the pressure sensor is located in the fuel injection valve and configured to detect pressure of fuel in an inner fuel passage from the fuel inlet hole of the fuel injection valve to the nozzle hole.

11. The fuel injection device according to claim 7, further comprising:

an orifice located in a fuel passage from the pressure-accumulation vessel to a fuel inlet hole of the fuel injection valve for attenuating pulsation in pressure of fuel flowing from the pressure-accumulation vessel, wherein the pressure sensor is located downstream of the orifice with respect to fuel flow.

12. The fuel injection device according to claim 7, wherein the storage unit is an IC memory.

13. A method for manufacturing a fuel injection device applied to a fuel injection system, which includes:

a fuel injection valve for injecting fuel distributed from a pressure-accumulation vessel pressure-accumulating fuel;

a pressure sensor located in a fuel passage from the pressure-accumulation vessel to a nozzle hole of the fuel injection valve and closer to the nozzle hole than the pressure-accumulation vessel, the pressure sensor for outputting a detection signal correspondingly to pressure of the fuel;

a storage unit for storing individual difference information indicating an output characteristic of the detection signal obtained by an examination; and a control unit for controlling an operation of the fuel injection valve based on the individual difference information stored in the storage unit and the detection signal, the fuel injection device examining the output characteristic and causing the storage device to store a result of the examining as the individual difference, the method comprising:

a first step for applying first test pressure and second test pressure actually to the pressure sensor and obtaining a detection signal when the first test pressure is applied and a detection signal when the second test pressure is applied;

a second step for calculating a difference between the first test pressure and the second test pressure as a test pressure change and calculating a difference between the detection signal when the first test pressure is applied and the detection signal when the second test pressure is applied as a detection signal change; and a third step for storing individual difference information, which is information indicating a relationship between the test pressure change and the detection signal change, in the storage unit, wherein the first step further includes:

changing the test pressure in a plurality of changing ranges different from each other when changing the test pressure by applying the first test pressure and the second test pressure;

changing alternately the test pressure so as to repeat increasing and decreasing with respect to a reference pressure; and changing alternately the test pressure at a changing speed corresponding to a changing speed when the detection signal changes attributed to start or end of fuel injection from the injection nozzle, wherein the first test pressure is the reference pressure and the second test pressure is at least one of a maximum value and a minimum value in the alternate change when the test pressure is changed alternately, the second step further includes calculating the test pressure change and the detection signal change for each of the plurality of changing ranges different from each other, and the third step further includes storing the test pressure change and the detection signal change, calculated for each of the plurality of changing ranges different from each other, as the individual difference information.

14. A method for manufacturing a fuel injection device applied to a fuel injection system, which includes:

a fuel injection valve for injecting fuel distributed from a pressure-accumulation vessel pressure-accumulating fuel;

a pressure sensor located in a fuel passage from the pressure-accumulation vessel to a nozzle hole of the fuel injection valve and closer to the nozzle hole than the pressure-accumulation vessel, the pressure sensor for outputting a detection signal correspondingly to pressure of the fuel;

a storage unit for storing individual difference information indicating an output characteristic of the detection signal obtained by an examination;

a control unit for controlling an operation of the fuel injection valve based on the individual difference information stored in the storage unit and the detection signal, the pressure sensor including a sensor element for converting pressure of fuel into an electric signal; and a waveform processing unit for inputting the electric signal and performing a waveform processing of the inputted electric signal to output the detection signal, a storage unit for storing individual difference information, and a control unit for controlling the fuel injection valve based on the stored individual difference information and the detection signal, the fuel injection device examining the output characteristic and causing the storage device to store a result of the examining as the individual difference, the method comprising:

a first step for inputting a first test electric signal and a second test electric signal in the waveform processing unit and obtaining a detection signal when the first test electric signal is inputted and a detection signal when the second test electric signal is inputted;

a second step for calculating a difference between the first test electric signal and the second test electric signal as a test electric signal change and calculating a difference between the detection signal when the first test electric signal is inputted and the detection signal when the second test electric signal is inputted as a detection signal change; and a third step for storing individual difference information, which is information indicating a relationship between the test electric signal change and the detection signal change, in the storage unit, wherein the first step further includes:

changing the electric signal in a plurality of changing ranges different from each other when changing the electric signal by inputting the first test electric signal and the second test electric signal;

changing alternately the test electric signal so as to repeat increasing and decreasing with respect to a reference electric signal; and changing alternately the test electric signal at a changing speed corresponding to a changing speed when the detection signal changes attributed to start or end of fuel injection from the injection nozzle, wherein the first test electric signal is the reference electric signal and the second test electric signal is at least one of a maximum value and a minimum value in the alternate change when the test electric signal is changed alternately, the second step further includes calculating the test electric signal change and the detection signal change for each of the plurality of changing ranges different from each other, and the third step further includes storing the test electric signal change and the detection signal change, calculated for each of the plurality of changing ranges different from each other, as the individual difference information.

* * * * *